(12) United States Patent
Andersson et al.

(10) Patent No.: US 6,468,382 B1
(45) Date of Patent: *Oct. 22, 2002

(54) PACKAGING MATERIAL WITH GOOD GAS BARRIER PROPERTIES AND ALSO METHOD OF PRODUCING THE MATERIAL

(75) Inventors: Thorbjörn Andersson, Södra Sandby; Ann-Magret Asp, Lund, both of (SE)

(73) Assignee: Tetra Laval Holdings & Finance S.A., Pully (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 850 days.

(21) Appl. No.: 08/835,052

(22) Filed: Apr. 3, 1997

Related U.S. Application Data

(60) Continuation of application No. 08/442,776, filed on May 17, 1995, now abandoned, which is a continuation of application No. 08/183,979, filed on Jan. 21, 1994, now abandoned, which is a division of application No. 07/782,322, filed on Oct. 24, 1991, now Pat. No. 5,330,845.

(30) Foreign Application Priority Data

Nov. 7, 1990 (SE) ............................................... 9003542

(51) Int. Cl.[7] ............................................... B29C 47/00
(52) U.S. Cl. .............................. 156/244.27; 156/308.8; 156/324; 156/327; 156/333; 428/308.8; 524/556; 524/567; 524/568
(58) Field of Search ..................... 156/244.27, 308.8, 156/324, 327, 333; 428/308.8; 524/556, 567, 568

(56) References Cited

U.S. PATENT DOCUMENTS

| | | | | | |
|---|---|---|---|---|---|
| 1,986,954 A | * | 1/1935 | Abrams et al. | ............. | 156/278 |
| 2,399,338 A | * | 4/1946 | Ford | ........................ | 156/308.8 |
| 3,112,235 A | * | 11/1963 | Blanchard | ................... | 156/310 |
| 3,249,482 A | * | 5/1966 | Gilfillan | ...................... | 156/324 |
| 3,313,757 A | | 4/1967 | Trofimow et al. | | |
| 3,347,811 A | * | 10/1967 | Bissot | ........................ | 524/567 |
| 3,684,643 A | * | 8/1972 | Stepp | ...................... | 428/308.8 |
| 3,778,399 A | * | 12/1973 | Fazioli et al. | ............... | 156/327 |
| 3,886,017 A | * | 5/1975 | Brugh et al. | ........... | 156/244.27 |
| 4,701,360 A | | 10/1987 | Gibbons et al. | | |
| 4,789,575 A | | 12/1988 | Gibbons et al. | | |

FOREIGN PATENT DOCUMENTS

| | | | | |
|---|---|---|---|---|
| EP | 0 181 579 | | 5/1986 | |
| JP | 52-001115 | | 1/1977 | |
| JP | 58-59022 | * | 4/1983 | ............ 156/244.27 |

OTHER PUBLICATIONS

Hawley, Condensed Chemical Dictionary, 9th Edition, © 1977, p. 857.*

* cited by examiner

Primary Examiner—John J. Gallagher
(74) Attorney, Agent, or Firm—Burns, Doane, Swecker & Mathis, L.L.P.

(57) ABSTRACT

Packing material with good gas barrier properties comprising a first and a second layer of a fibrous material or, e.g. paper or cardboard, and a layer of a water based polymer, e.g. polyvinyl alcohol, placed between and in direct contact with the layers of fibrous material and functioning both as a gas barrier and as a binding agent in the packaging material.

The packaging material is produced through bringing together and binding together with each other a first and a second strip or sheet of a fibrous material by means of a layer of a water based polymer, e.g polyvinyl alcohol, applied between and in direct contact with the strips or sheets. The surplus water in the thus applied polymer layer is absorbed by the fibrous material in one and/or the other strip or sheet to form the intermediate layer functioning as gas barrier and binding agent.

13 Claims, 2 Drawing Sheets

PACKAGING MATERIAL WITH GOOD GAS BARRIER PROPERTIES AND ALSO METHOD OF PRODUCING THE MATERIAL

This application is a continuation of application Ser. No. 08/442,776, filed May 17, 1995, now abandoned which was a continuation of application Ser. No. 08/183,979, filed Jan. 21, 1994, now abandoned which was a divisional of application Ser. No. 07/782,322, filed Oct. 24, 1991, now U.S. Pat. No. 5,330,845.

BACKGROUND OF THE INVENTION

A. Field of the Invention

The present invention concerns a packaging material with good gas barrier properties, also in addition a method of producing the material.

Foodstuffs and other types of, oxidation and storage sensitive products already spoil or deteriorate after a very short time if they are exposed to the action of oxygen. In order to be able to package and keep the product for at least a certain time with maintained fresh qualities it is thus required that the product should be packaged in a packaging which is difficult to penetrate or best of all completely impenetrable for oxygen which would otherwise easily be able to penetrate into the packaging and cause the product to,deteriorate.

B. Description of Relevant Art

A well known example of a packaging material which has good gas barrier properties and which is often used in packagings for liquid foodstuffs of the type, such as juice, wine, edible oil etc is built up of layers of paper or cardboard and plastic with a gas barrier layer of aluminum (Al foil) applied to one side of the paper or cardboard layer. An Al foil is in itself completely impenetrable for oxygen and has also other valuable barrier properties for the product packaged. e.g. to penetrability by light, at the same time as during the forming of the material into packagings it makes it possible to execute tight and mechanically strong joints in the material through inductive heating. The problem with Al foil has, however, always been that it is expensive and that it is practically inelastic which has often entailed that it has cracked or burst in regions of material which have been exposed to particularly strong tensile strains during production of the packaging. There has therefore been a wish to find a cheaper but just as effective alternative to Al foil.

The Swedish patent no. 8200761-8 gives details of a packaging material completely free from Al foil with good barrier properties. This known material comprises a skeletal layer of paper or cardboard and a gas barrier layer of polyvinyl alcohol (PVAL) applied to one side of the skeletal layer. A layer of PVAL has, as is known, good gas-tight properties so long as the polymer layer is dry, but quickly loses its barrier properties in proportion as the moisture content in the layer increases. In order to protect the PVAL layer against moisture it is therefore proposed in the Swedish patent that the outside of the PVAL layer should be covered with plastic, preferably polyethylene. According to the Swedish patent the packaging material is produced through an aqueous dispersion or aqueous emulsion of PVAL being applied along one side of a strip or a sheet of paper or cardboard, after which "the surplus water" in the layer applied is driven away through heating to form a dry, coherent PVAL layer. The PVAL layer and the other side of the strip or sheet are subsequently coated with the moisture-repellent plastic coatings which are extruded on to the two sides of the strip or sheet.

The disadvantage with the procedure described in the Swedish patent is that PVAL cannot be applied as a pure aqueous dispersion or aqueous emulsion but requires at least one further chemical component or thickener in order to avoid the water in the dispersion or emulsion applied being sucked into and absorbed by the water-absorbent material in the strip or sheet. Another disadvantage which is at least partly connected with the water-absorbent properties of the sheet or strip material is that the PVAL layer applied must be dried through heating in order to adjust the correct moisture content in the PVAL layer, which makes the known procedure energy and therefore cost intensive.

SUMMARY OF THE INVENTION

An aim of the present invention is to give details about a packaging material with good gas barrier properties without problems or disadvantages of the kind described above.

This aim is achieved according to the invention through the fact that a packaging material of the type described in the introduction is given the characteristics that it comprises a first and second layer of a fibrous material and a layer of a water based polymer between and in direct contact with the layers of fibrous material, which functions both as a binding agent and as a gas barrier in the packaging material.

Another aim of the invention is to indicate a method of producing the laminated packaging material with the use of a water based polymer of, for example, the type which is described in the abovementioned patent, without any requirements either for further chemical components or for thickeners and without any requirements to dry an applied polymer layer through energy and cost intensive heating.

This aim is achieved according to the invention through the fact that the method is given the characteristics that a first and a second strip or a first and a second sheet of a fibrous material are brought together and bound to each other with the aid of a layer of a water based polymer which is added between and in direct contact with the strips or sheets, and that the fibrous, material in one or both strips or in one or both sheets is, utilized to absorb away water from and adjust the moisture content in the water based polymer to form an intermediate layer functioning as binding agent and gas barrier in the packaging material.

Further advantageous and practical embodiments of the packaging material and method of producing the packaging material according to the invention respectively have further been given the characteristics mentioned in the sub-claims below.

BRIEF DESCRIPTION OF THE DRAWINGS

The invention will be described and explained in greater detail with reference to the enclosed drawings in which.

DETAILED DESCRIPTION OF PREFERRED EMBODIMENTS

Figure 1:
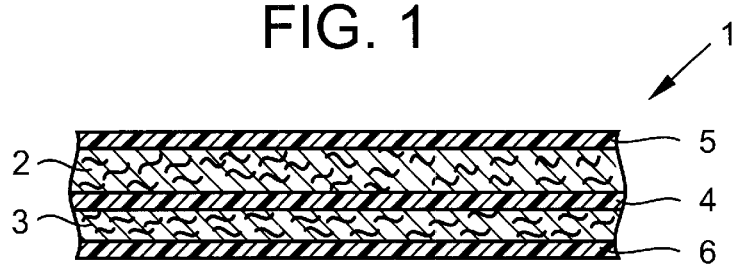
FIG. 1 shows schematically a cross section of a packaging material according to a preferred embodiment of the invention, FIG. 2 explains schematically the production of the packaging material in FIG. 1 according to a first embodiment of the invention, FIG. 3 explains schematically the production of the packaging material in FIG. 2 according to another embodiment of the invention, FIG. 4 explains schematically the production of the packaging material in FIG. 2 according to a third embodiment of the invention.

The packaging material in the embodiment of the invention shown has been given the general reference designation 1. The packaging material 1 comprises a first layer of a fibrous material 2, e.g. paper or cardboard, and another layer of a fibrous material 3, e.g. paper or cardboard, which are bound to each other with the aid of an intermediate layer of a water based polymer 4 serving as gas barrier and binding agent in direct contact with the two surrounding layers of fibrous material. The packaging material 1 comprises in addition further moisture repellent coatings of plastic 5 and 6, preferably polyethylene, which are placed against the outsides of the respective layers of fibrous material 2 and 3.

The gas barrier layer 4 consists of a water based polymer whose gas barrier properties increase with decreasing moisture or water content in the polymer layer and a known example of such a water based polymer is the previously described polyvinyl alcohol. Other known water based polymers which can be used in the packaging material according to the invention are ethylene acrylic acid (EAA) and polyvinylidene chloride. In the embodiment shown it is, however, assumed that the polymer layer consists of polyvinyl alcohol (PVAL).

The two layers of fibrous material 2 and 3 can consist of the same fibrous material, but preferably the one layer of fibrous material 2 serving as the main body consists of strong paper or cardboard while the other layer of fibrous material 3 consists of a paper of butter paper type, e.g. greaseproof paper, glassine etc.

Figure 2:
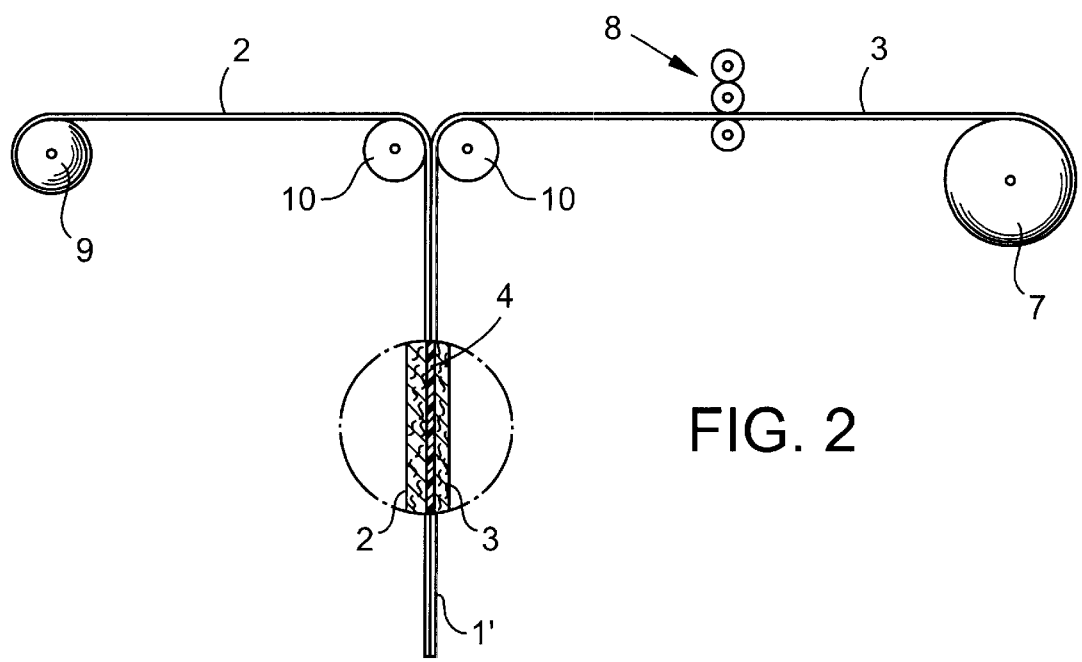

FIG. 2 explains schematically how the packaging material 1 can be produced according to a first embodiment of the method according to the invention. A first strip of a fibrous material 3, e.g. greaseproof paper, is unrolled from a feed roller 7 and along its one side a layer of an aqueous emulsion or aqueous dispersion containing between 5 and 20 weight % PVAL is applied with the aid of a cylinder or roller arrangement shown at 8. Another strip of a fibrous material 2, e.g. paper or cardboard, is unrolled from a feed roller 9 and brought together with and joined together with the first strip 3 through squeezing between two co-rotating pressure cylinders or pressure rollers 10 in order to press together and bind the two strips 2 and 3 together with each other with the applied PVAL layer 4 placed between and in direct contact with the two strips, as can be seen from the circled enlarged area in FIG. 2.

Through the pressing together of the strips 2 and 3 the surplus water in the applied PVAL layer on the first strip 3 will be absorbed by the fibrous material in the other strip 2 to form the intermediate layer 4 serving as a gas barrier, which at the same time binds the two strips 2 and 3 together with each other with good adhesion.

The laminate 1' formed is subsequently provided in a known manner with further coatings 5 and 6 of moisture repellent plastic, preferably polyethylene which is extruded against both sides of the laminate to form the finished packaging material 1.

Figure 3:
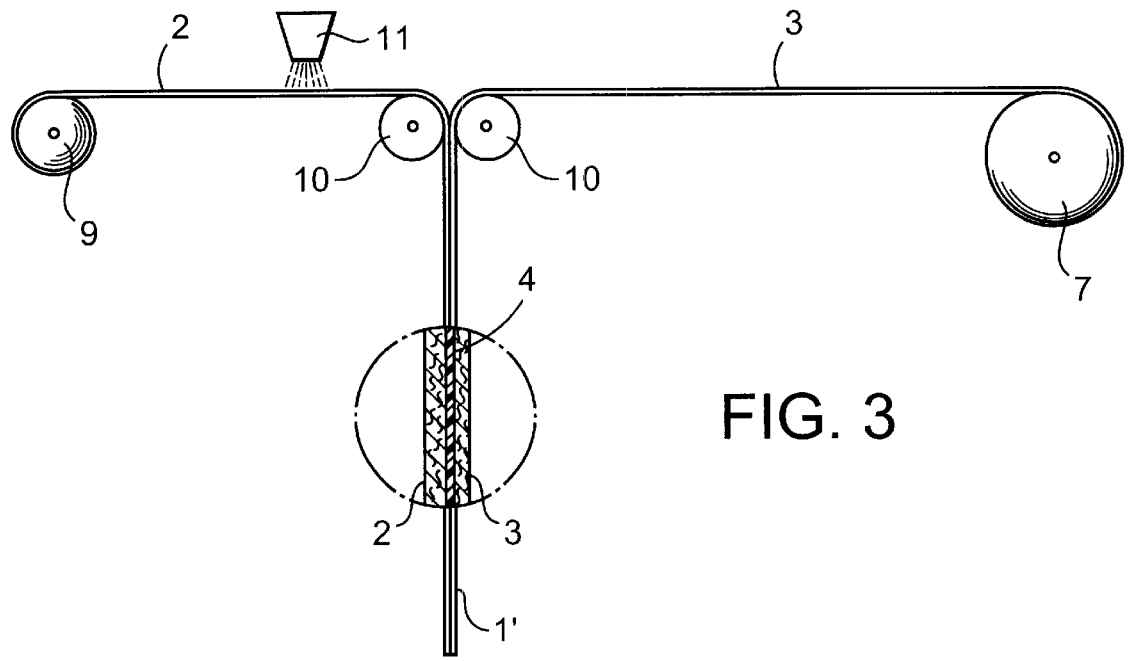

FIG. 3 explains how the packaging material 1 can be produced in a manner according to another embodiment of the invention. A strip of a fibrous material 2, e.g. paper or cardboard, which has a dry layer of PVAL previously applied along one side of the strip, is unrolled from a feed roller 9 and wetted with water which is applied to the strip's PVAL-coated side with the aid of a shower or spray device 11. A strip 3 of a fibrous material, e.g. paper or cardboard, is unrolled from a feed roller 7 and brought together and joined together with the thus wetted strip 2 through squeezing between two co-rotating pressure cylinders or pressure rollers 10 to press together and bind the two strips 2 and 3 together with each other with the water activated PVAL layer 4 placed between and in direct contact with the fibrous material in the two strips. In this example the dry fibrous material in the second strip 3 will absorb the water from and adjust the moisture content in the water activated PVAL layer in contact with the first strip to form the PVAL layer 4 serving as a gas barrier which at the same time binds the two strips 2 and 3 together with each other with good adhesion.

The laminate 1' formed is subsequently provided in a known manner with further moisture repellent coatings 5 and 6 of plastic, preferably thermoplastic, which is applied along both sides of the laminate 1' through extrusion to form the finished packaging material 1 according to the invention.

Figure 4:
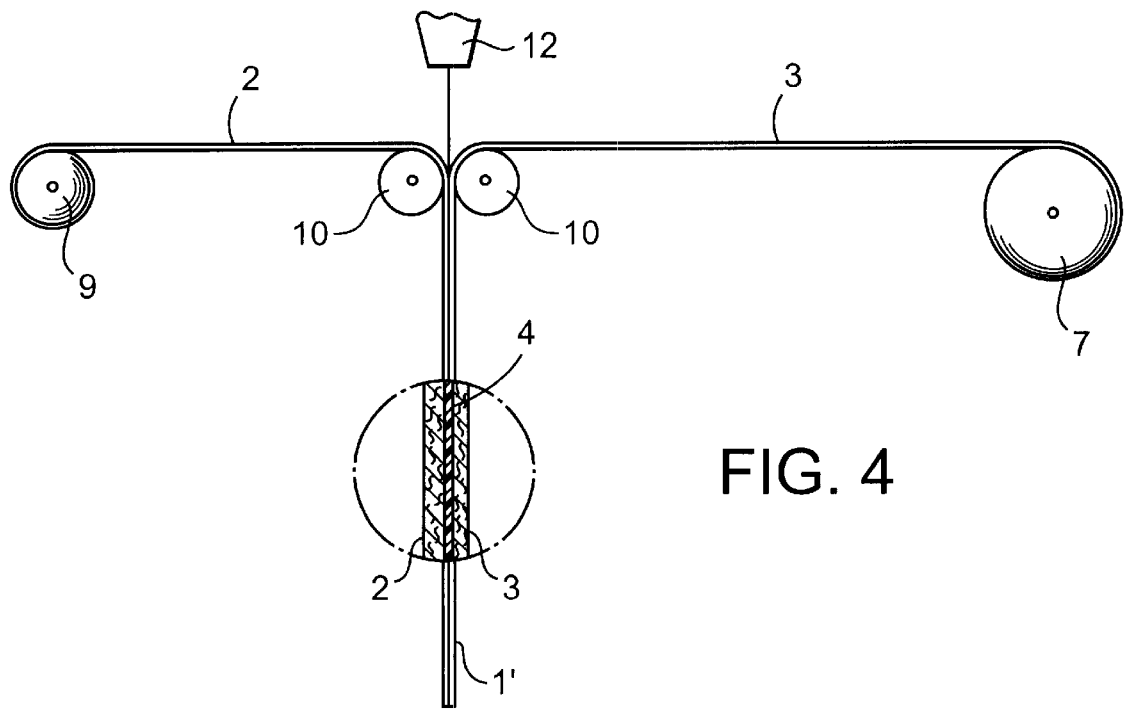

FIG. 4 finally shows how the packaging material 1 can be produced according to a third embodiment of the method according to the invention. In this example a first strip of a fibrous material 3, e.g. paper or cardboard, is unrolled from a feed roller 7 and a second strip of a fibrous material 2, e.g. paper or cardboard, from a feed roller 9. The two strips are brought together with each other and joined together with each other through squeezing between two co-rotating pressure cylinders or pressure rollers 10 at the same time as a layer, of water-containing PVAL is applied between and in direct contact with the strips with the aid of an extrusion device 12 at the cylinders or rollers 10. In this example the fibrous material in both the strips will absorb the water from and adjust the moisture content in the PVAL layer applied to form the coherent intermediate layer 4 serving as a gas barrier which at the same time binds the two strips 2 and 3 together with each other with good adhesion.

The laminate 1' formed can subsequently be provided in a known manner with further coatings 5 and 6 of plastic, preferably thermoplastic, which are applied to the two sides of the laminate 1' by extrusion to form the finished packaging laminate 1 according to the invention.

As can be seen from the description above, it is thus possible according to the invention to produce a packaging material with good gas barrier properties without the use of an Al foil and without the need of a thickener or other chemical components in the emulsion or dispersion of the water based polymer forming a gas barrier layer which is applied. Further it is possible according to the invention completely to, avoid a separate heating stage to drive away water and adjust the moisture content in the aqueous emulsion or dispersion applied, at the same time as the packaging material according to the invention can be produced without the use of separate binding agents of the type adhesives to bind together and keep together with good adhesion the individual layers of material going into the packaging material.

It must finally be observed that the examples explained above are not in any way intended to limit the invention, and that the idea forming the basis of the invention can also be realized, with modifications which are the concern of the specialist without detracting from the framework of the invention defined by the following patent claims.

What is claimed is:

1. Method of producing a laminated packaging material with good gas barrier properties, wherein a first and second strip or a first and a second sheet of a fibrous material are brought together with and bound to each other with the aid of a layer consisting of a water based polymer of ethylene and acrylic acid (EAA) or polyvinylidene chloride which is brought in between and in direct contact with the strips or sheets, and wherein the fibrous material in one or both strips or in one or both sheets is utilized to absorb away the water from and adjust the moisture content in the water based polymer without a heat-drying step, to form an intermediate layer in the packaging material functioning both as a binding agent and a gas barrier.

2. Method according to claim 1 wherein the polymer is applied as an aqueous dispersion along one side of one strip or one sheet, and that the fibrous material in the second strip or in the second sheet is used to absorb water from and reduce the moisture content in the aqueous dispersion to form the said intermediate layer.

3. Method according to claim 1 wherein the water based polymer is introduced as an extruded layer between the strips or sheets in conjunction with the fact that the strips or sheets are brought together with each other, whereby the fibrous material in the two strips or sheets is used to absorb water from and reduce the moisture content in the extruded water based polymer layer to form the said intermediate layer.

4. Method according to claim 1 wherein the fibrous material in at least one strip or one sheet consists of a butter paper.

5. Method according to claim 1 wherein the fibrous material in at least one strip or one sheet consists of a greaseproof paper.

6. Method according to claim 1 wherein the fibrous material in at least one strip or one sheet consists of paper or cardboard.

7. Method according to claim 1, wherein an outer coating of plastic is applied to an outer surface of at least one strip or sheet in the laminated packaging material.

8. Method of producing a laminated packaging material with good gas barrier properties, wherein a first strip or sheet of paper or cardboard and a second strip or sheet of a greaseproof paper are brought together and bound to each other with the aid of a layer consisting of a water based polymer which is brought in between and in direct contact with the strips or sheets, and wherein the paper or cardboard in the first strip or sheet is utilized to absorb the water from and adjust the moisture content in the water based polymer without a heat-drying step, to form an intermediate layer in the packaging material functioning both as a binding agent and a gas barrier.

9. Method according to claim 8, wherein an outer coating of plastic is applied to an outer surface of at least one strip or sheet in the laminated packaging material.

10. Method of producing a laminated packaging material with good gas properties, wherein a first strip or sheet of paper or cardboard and a second strip or sheet of a greaseproof paper are brought together and bound to each other with the aid of a layer consisting of a water polymer which is brought in between and in direct contact with the strips or sheets, said water based polymer being selected from the group consisting of polyvinyl alcohol, ethylene-acrylic acid and polyvinylidene chloride, and wherein the paper or cardboard in the first strip or sheet is utilized to absorb the water from and adjust the moisture content in the water based polymer without a separate heat-drying step, to form an intermediate layer in the layer in the packaging material functioning both as a binding agent and a gas barrier.

11. Method according to claim 10, wherein the polymer is polyvinyl alcohol or ethylene-acrylic acid.

12. Method according to claim 10, wherein an outer coating of plastic is applied to an outer surface of at least one strip or sheet in the laminated packaging material.

13. Method according to claim 10, wherein the water based polymer is ethylene-acrylic acid (EAA) or polyvinylidene chloride (PVdC).

* * * * *